United States Patent
Parisini et al.

(10) Patent No.: US 7,918,719 B2
(45) Date of Patent: Apr. 5, 2011

(54) FEEDER FOR MACHINE FOR CANNING TUNA AND THE LIKE AND RELATED OPERATING CYCLE

(75) Inventors: Gianluca Parisini, Parma PR (IT); Ian Thomas Cooper, Gattatico RE (IT)

(73) Assignees: John Bean Technologies S.p.A., Parma PR (IT); Bolton Alimentari S.p.A., Cermenate CO (IT)

( * ) Notice: Subject to any disclaimer, the term of this patent is extended or adjusted under 35 U.S.C. 154(b) by 0 days.

(21) Appl. No.: 12/795,475

(22) Filed: Jun. 7, 2010

(65) Prior Publication Data

US 2010/0317274 A1  Dec. 16, 2010

(30) Foreign Application Priority Data

Jun. 12, 2009 (EP) .................................... 09425230

(51) Int. Cl.
*A22C 21/00* (2006.01)
(52) U.S. Cl. ...................................................... 452/174
(58) Field of Classification Search .................. 452/149, 452/155, 174, 177–183
See application file for complete search history.

(56) References Cited

U.S. PATENT DOCUMENTS

| | | | |
|---|---|---|---|
| 3,700,386 A | 10/1972 | Mencacci | |
| 4,839,181 A * | 6/1989 | MacMurray et al. | 426/237 |
| 6,882,434 B1 * | 4/2005 | Sandberg et al. | 356/601 |
| 7,001,261 B2 * | 2/2006 | Johnson et al. | 452/150 |
| 7,096,769 B2 * | 8/2006 | Biggs et al. | 83/435.2 |
| 7,204,748 B2 * | 4/2007 | Gasbarro | 452/149 |
| 7,252,584 B2 * | 8/2007 | Kragh | 452/163 |
| 7,450,247 B2 * | 11/2008 | Sandberg et al. | 356/601 |
| 2003/0097819 A1 | 5/2003 | Fischer et al. | |
| 2005/0014459 A1 | 1/2005 | Simon et al. | |

OTHER PUBLICATIONS

EP Search Report for EP09425230 filed on June 12, 2009 in the name of John Bean Technologies S.P.A. and Bolton Alimentari S.P.A.

* cited by examiner

*Primary Examiner* — Thomas Price
(74) *Attorney, Agent, or Firm* — Steinfl & Bruno LLP (57) ABSTRACT

A feeder for a machine for canning tuna and similar food products includes a feeding device with conveyor belts. The feeding device is suitable to feed tuna loins towards the conveyor belt of the canning machine and to shape the loins into loins having a set thickness. An outlet mouth is located at the end of the belts, together with a knife adjacent to the mouth and suitable to separate the portion of loin projecting through the latter. A mobile wall located opposite the outlet mouth is also provided, as well as a mobile shovel suitable to move the newly formed tuna pat perpendicularly in the direction of motion of the conveyor belt of the canning machine.

17 Claims, 7 Drawing Sheets

FEEDER FOR MACHINE FOR CANNING TUNA AND THE LIKE AND RELATED OPERATING CYCLE

CROSS REFERENCE TO RELATED APPLICATIONS

The present application claims priority to European Patent Application No. 09425230.1 filed on Jun. 12, 2009 which is incorporated herein by reference in its entirety.

FIELD

The present disclosure relates to machines for canning tuna and the like, and in particular to a feeder suitable to feed such a machine with a regular flow of product, as well as to relevant related operating cycle.

In the following, specific reference will be made to the canning of tuna yet it is clear that what is being said is also applicable to the canning of other food products having similar characteristics, such as other types of fish, meat, etc.

BACKGROUND

It is known that the main difficulties in canning tuna are obtaining cans of constant weight, so as to avoid production waste, and presenting the consumer with a good-looking product when the can is opened, since this determines the product value to a great extent. Such difficulties are not easy to overcome due to the intrinsic nature of tuna, which is a food product showing ample variations in compactness, density and shape from batch to batch where not even from loin to loin.

Moreover it is obvious that the manufacturer tries to obtain the maximum quantity of finished product from the raw material, which must therefore be treated so as to avoid as much as possible crumbling and loss of liquids that lead to a decrease in weight of the raw material to be canned. Clearly, all of the above must be achieved through a machine that guarantees an adequate productivity, since machines and methods that are too slow result in excessive costs.

A particularly critical phase is the placing of the tuna on the conveyor belt of the canning machine, which feeds the tuna towards the dosing chambers, because the tuna loins to be loaded on the belt are usually too small or too large and therefore require an intervention by the operator who must manually adapt them to the required size.

A first drawback of this feeding method is the damage to the tuna loin that inevitably results from such a manual intervention since the operator must act quickly and in a rough manner, with inescapable wastes of tuna that reduce the yield of the raw material and an inconstant density of the fed product that affects the precision in determining the weight of the tuna cake in the dosing chamber.

Another drawback of the operator's manual intervention is the fact that the experience of the operator in handling the tuna loins significantly affects the quality of the finished product, since the smaller the damage the tuna undergoes in the loading step the greater its value when canned.

Finally, it should be noted that this feeding method requires the presence of at least two when not even three operators to guarantee a continuous feed to the canning machine and to prevent possible irregularities or voids in the feed, that would easily occur in case of use of a single operator who cannot constantly operate in an optimal way.

In the light of the above, it is therefore clear that this initial phase of the tuna canning process is particularly critical because it requires a lot of labor and is thus expensive, slows down the process and may negatively affect the yield and quality of the product.

The canning machine disclosed in US 2003/0097819 A1 includes a feeder with a single conveyor belt and a knife to cut away from a tuna loin a portion of loin that is subsequently pushed by a piston which compresses it in a pair of forming chambers.

The tuna loin is still loaded manually on said conveyor belt and does not undergo any pre-shaping prior to being compressed in the forming chambers.

SUMMARY

Embodiments of the present disclosure are directed at providing a feeder for a canning machine which overcomes the above-mentioned drawbacks. According to an aspect of the present disclosure, a feeder as defined in claim 1 can be provided, which is capable of preparing tuna "pats" of suitable shape and size, with substantially constant characteristics and to feed them to the machine in a continuous way. Further features of the present feeder are recited in the dependent claims, while the relevant operating cycle is defined in claim 14.

According to several embodiments of the present disclosure, tuna cakes with premium quality appearance and constant weight can be obtained, thanks to the fact that the tuna is not damaged by rough manual treatments and is fed with substantially constant characteristics. This also allows to reduce the waste in the canning machine, that operates at the best thanks to the feed of a pre-treated raw material.

Additionally, according to several embodiments of the present disclosure, a production line with high productivity can be achieved thanks to the simplification and automation of the tuna loading phase. This allows the canning machine to operate at higher rates, substantially not limited by the operator's capacity, and to require less labour to exploit the maximum speed of the machine.

DETAILED DESCRIPTION

Figure 1:
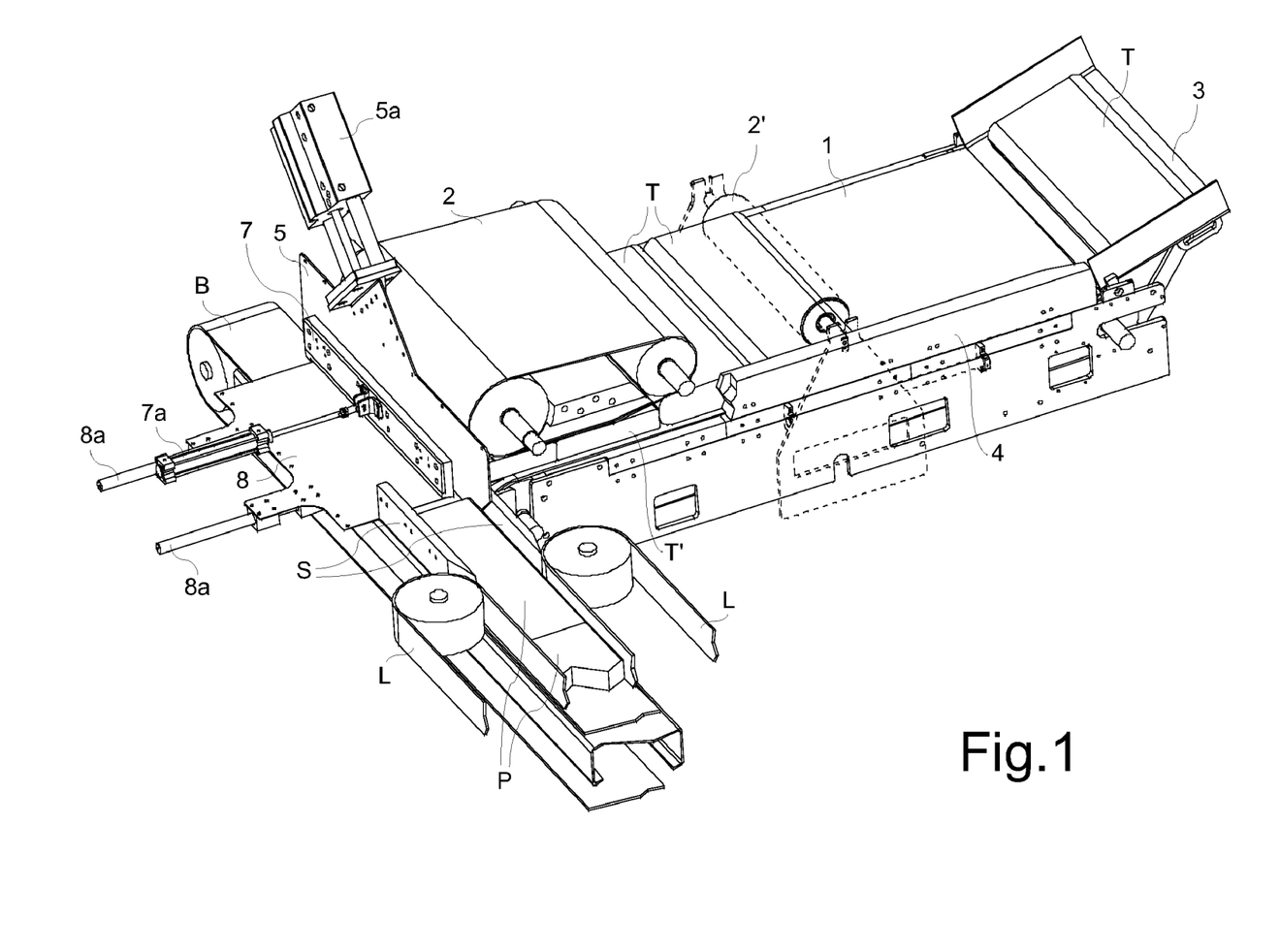
FIG. 1 is front perspective view diagrammatically showing the structure of the feeder according to an embodiment of the disclosure.
Figure 2:
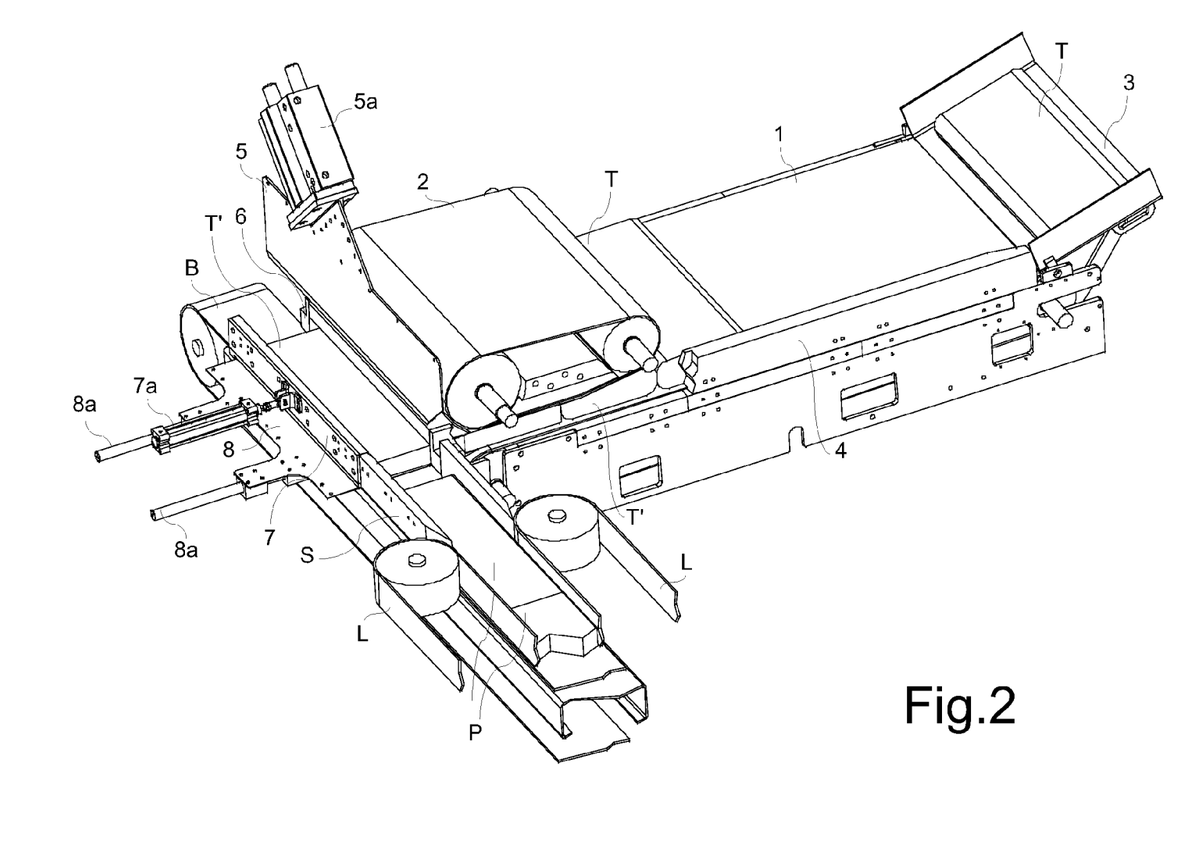
FIGS. 2-6 are views similar to the preceding one that show the operating cycle of said feeder.

With reference to FIGS. 1 and 2, there is seen that a feeder according to an embodiment of the present disclosure includes a feeding device formed by a bottom conveyor belt 1 and a shorter top conveyor belt 2, overlapping the former and aligned therewith at the forward outlet end. The tuna loins T, which the operator has simply removed from their package, are placed on belt 1 by means of a chute 3, arranged at the rear end thereof, to be fed towards the top belt 2 along a path defined by a containment wall 4 whose forward portion has been removed for the sake of clarity.

The operating distance between the two belts 1, 2 is adjustable through a suitable device so as to define a required distance corresponding to the final thickness of the tuna pat that is meant to be obtained; to this purpose, reference T' indicates a tuna loin that has been reduced to the desired thickness. Furthermore, the possibility of adjusting the inclination of the top belt 2 is provided, so as to change the angle between the two belts 1, 2 to make easier the introduction of the tuna loins T and their compacting.

Optionally, above the bottom belt 1 and at a position to the rear of the top belt 2, a transverse idle roller 2' (shown in broken lines in FIG. 1) can be provided. Such an idle roller 2' would substantially act as a pre-compacting rolling pin, whose distance from belt 1 would be adjustable, and it could even be provided with a reciprocating motion in the longitudinal direction with respect to belt 1 with the aim of facilitating the compacting job requested to the top belt 2.

At the forward end of belts 1, 2 a cross-knife 5 perpendicular thereto is arranged, said knife 5 having such a length as to cover the belt width and such a height as to cover the outlet mouth 6 of the feeding device. Knife 5 is driven by a suitable pneumatic cylinder 5a with an oblique motion intended for a better cutting operation of the tuna loin T' projecting through the outlet mouth 6. To this purpose, the members making up mouth 6 also act as a guide for knife 5; moreover, they also have the purpose of scraping from belts 1, 2 the tuna that could stick to the belts during the compacting phase, as better illustrated in the enlarged detail of FIG. 7, in order to maximize the yield of the raw material loaded into the feeder.

Since the present feeder is intended to replace the operator in placing the tuna on the conveyor belt B of the canning machine, it is arranged perpendicularly at the rear end portion of belt B, next to the side walls S that act as entrance to the side belts L that cooperate with belt B in feeding to the dosing chambers the tuna pats P formed with the required thickness and width.

Opposite the outlet mouth 6 there is arranged a mobile wall 7, having at least the same width, which is mounted on the stem of a pneumatic cylinder 7a and aligned with the relevant side wall S when said stem is completely retracted (FIG. 2), the distance from mouth 6 to wall 7 corresponding to the maximum width of the tuna pat to be formed. The stem of cylinder 7a can be extended up to placing the mobile wall 7 in contact with knife 5 (FIG. 1), whereby when the latter is raised wall 7 prevents the possible fall of the portion of the tuna loin T that could have crumbled during the previous cut.

The mobile wall 7 moves perpendicularly to the conveyor belt B yet not in direct contact therewith, since a mobile shovel 8 mounted on rods 8a is arranged between wall 7 and belt B. Said shovel 8 also has a width at least equal to the width of the outlet mouth 6, as well as a length greater than the width of belt B whereby the tuna loin T' passing through mouth 6 is completely received on shovel 8 without contacting the underlying belt B, as better illustrated in the enlarged detail of FIG. 7. Moreover, shovel 8 is mobile not only longitudinally as the mobile wall 7, but also perpendicularly to belts 1, 2, i.e. in the direction of motion of belt B.

The simple and effective operation of the feeder according to the present invention and the relevant operating cycle are readily understood from the following description and the subsequent explanation, given with reference also to FIGS. 3 to 6.

In the initial position of FIG. 1, the tuna loins T are pushed by the operator along belt 1 until they stop against the already compacted loins T' under belt 2, the latter being in turn blocked by knife 5 that closes the outlet mouth 6, with the mobile wall 7 and shovel 8 positioned in contact with knife 5. As it can be noted from the enlarged detail of FIG. 7, shovel 8 is located just below the outlet mouth 6 so as to achieve a continuous path for the tuna without risks of stumbling.

In this position the previously formed tuna pats P are fed by the side belts L and by conveyor belt B of the canning machine according to the advancing frequency of the latter, independently of the feeder.

In the subsequent feeding phase, shown in FIG. 2, knife 5 is raised to open the outlet mouth 6 and belts 1, 2 are activated to push the first tuna loin T' through said mouth 6 and on shovel 8; the latter remains still so as to receive all the tuna, including possible crumbles caused by the previous cut, and thus minimize the waste. In this phase the mobile wall 7 moves back under the push of the tuna, since the pneumatic cylinder 7a is in the discharge position, until it reaches the rearmost position of alignment with wall S that defines the tuna pat width.

Figure 3:
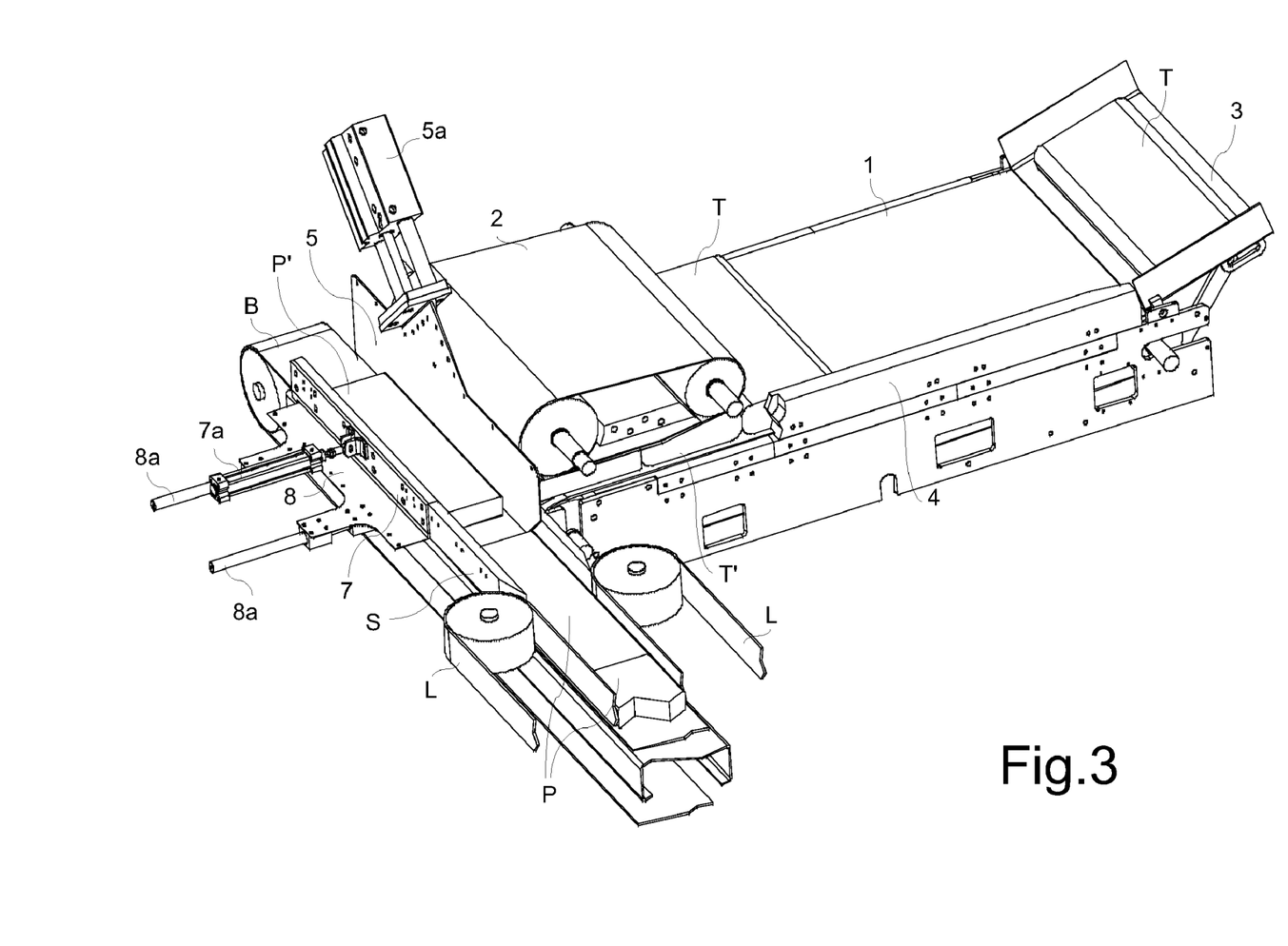
Figure 7:
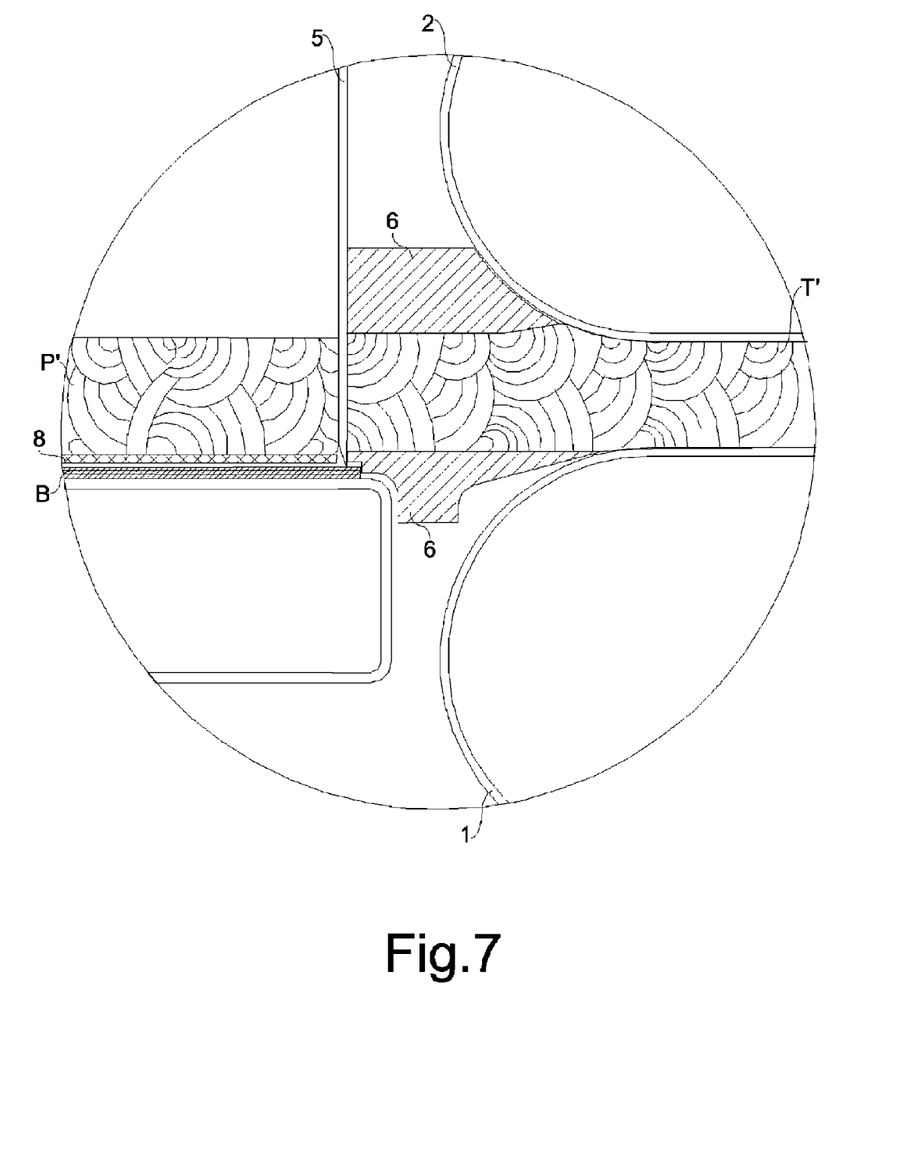
FIG. 7 is an enlarged lateral sectional view of the tuna pats cutting region in the position corresponding to FIGS. 3-6.

Whereafter, as shown in FIG. 3, in the subsequent cutting phase knife 5 is lowered to cut longitudinally the tuna loin T' projecting through the outlet mouth 6, so as to obtain a tuna pat P' having the required thickness and width while closing mouth 6 (FIG. 7).

It should be noted that in the meantime the previous tuna pats P have advanced along belt B according to the request by the canning machine, since shovel 8 isolates from belt B the tuna fed by belts 1 and 2.

Figure 4:
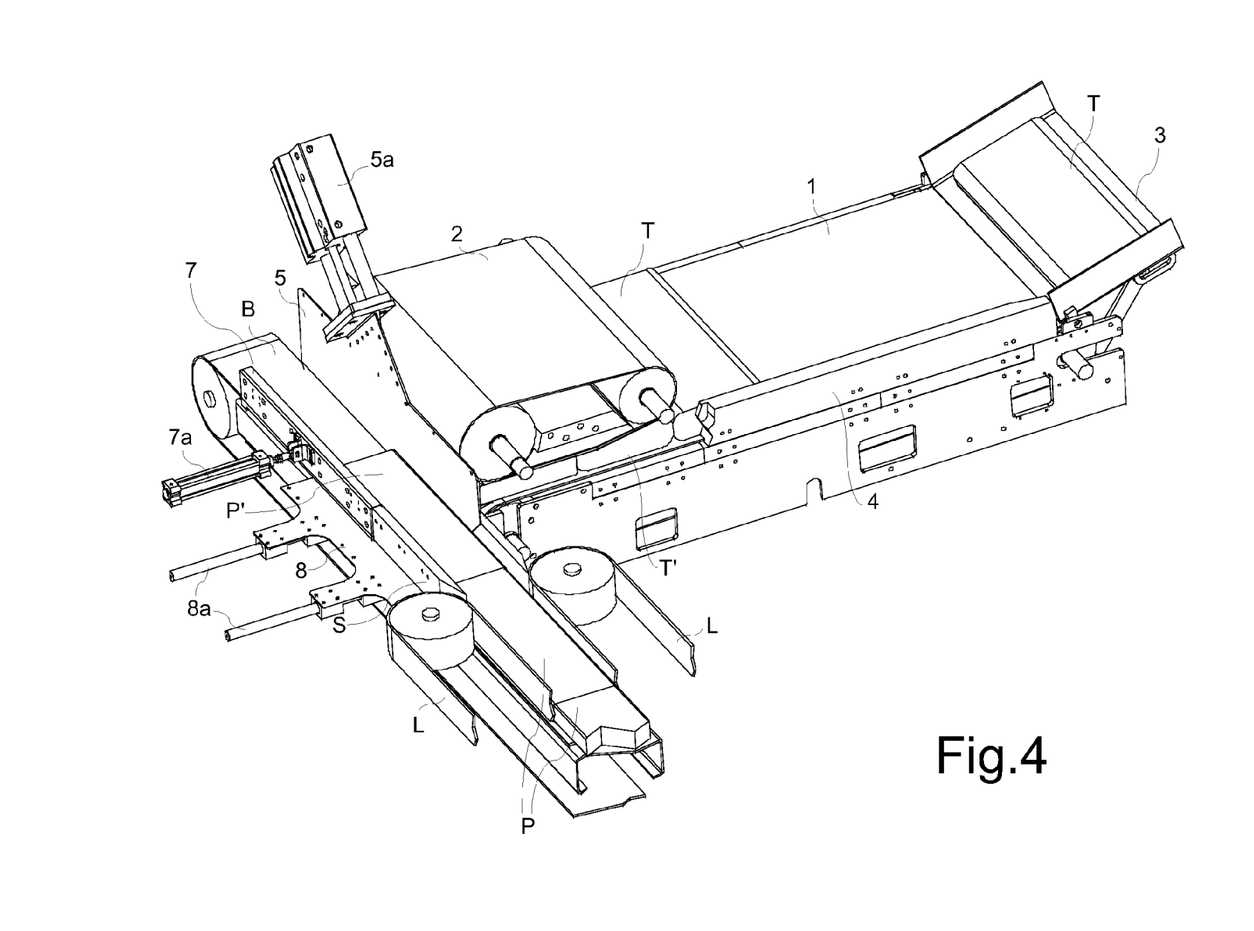

In the subsequent pursuit phase, shown in FIG. 4, shovel 8 moves perpendicularly, i.e. longitudinally with respect to belt B, sliding under the side wall S until it takes the newly-formed pat P' at a preset distance (which can even be nothing) from the last pat P that is advancing on belt B so as to obtain a continuous tuna feed.

The pursuit is calculated starting from the containment wall 4 that defines the leading edge of pat P', and the distance between the pats is defined according to the needs of the canning machine (e.g. the further compression and extension of the pats being fed to the dosing chambers).

Figure 5:
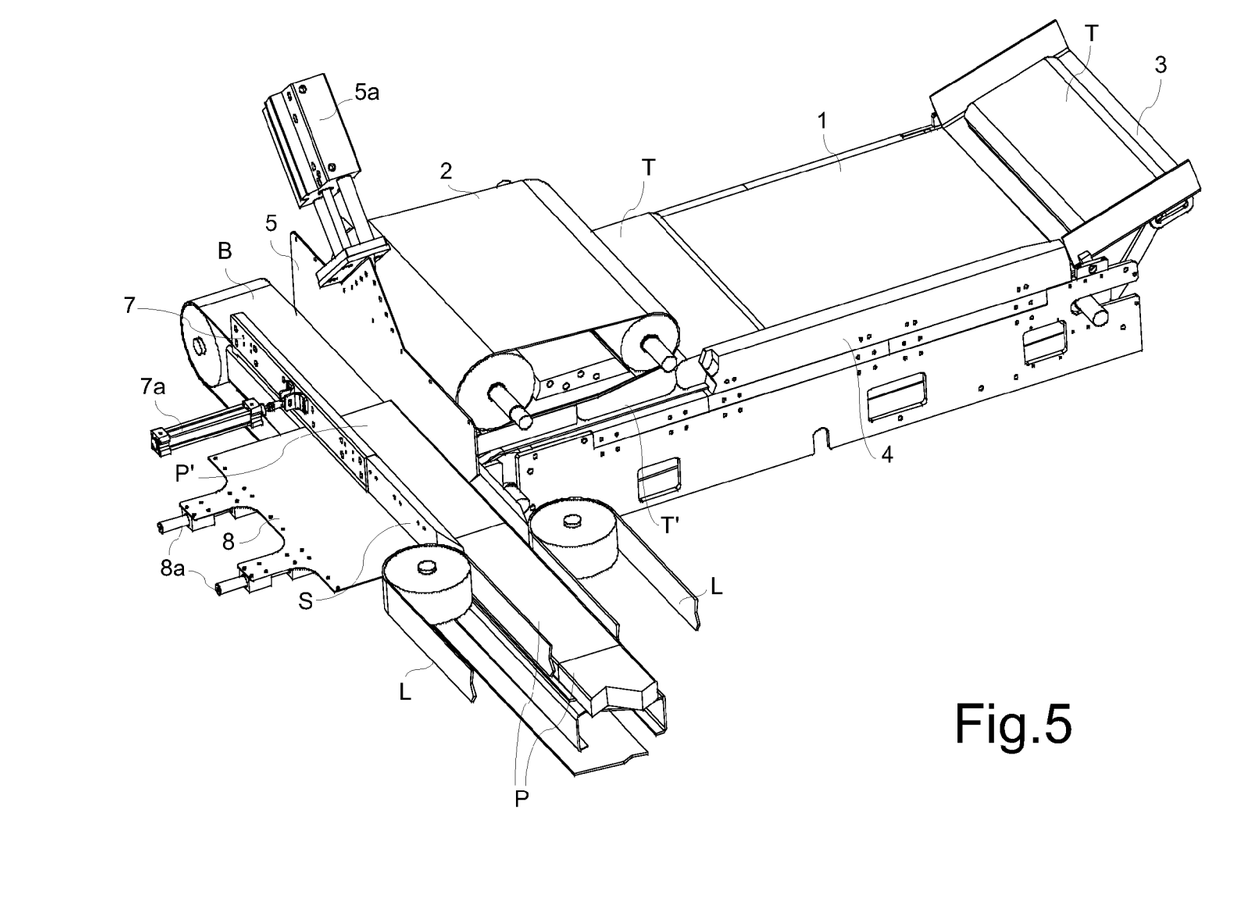

Whereafter, as shown in FIG. 5, in the subsequent unloading phase rods 8a retract shovel 8, i.e. move it perpendicularly with respect to belt B, so that pat P' abuts laterally on the mobile wall 7 and the side wall S and is unloaded from shovel 8 onto belt B and starts advancing together with the other pats P.

Figure 6:
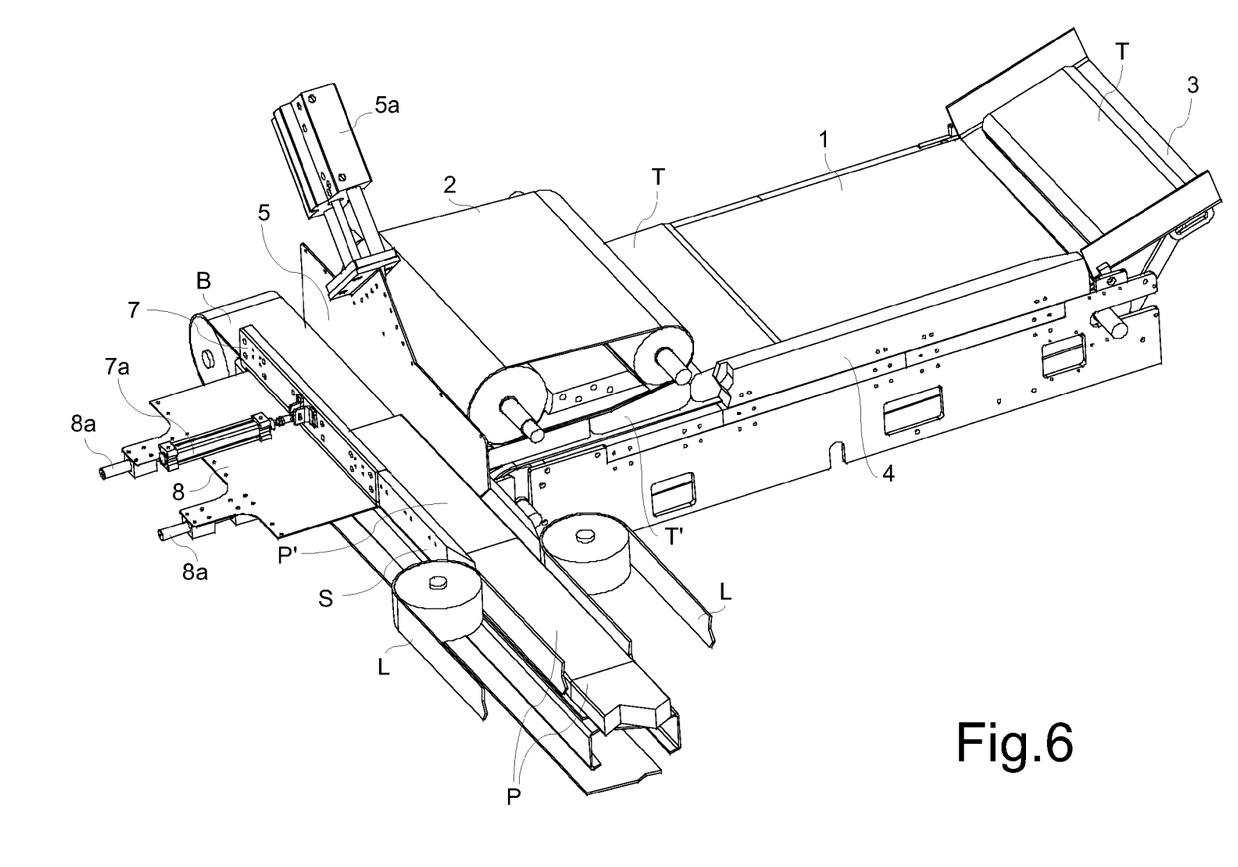

Finally, in the return phase, illustrated in FIG. 6, shovel 8 returns to the position under wall 7 and together therewith waits for the tail of pat P' to reach wall S, thus clearing the operating area of the feeder. Whereafter wall 7 and shovel 8 can move forward into abutment against knife 5 thus returning to the starting position of FIG. 1.

The passage of the tail of pat P' beyond the rear end of wall S is preferably detected by detecting means (not shown in the figures) that may include different types of sensors such as cameras, photocells and the like. In this way, there is prevented the risk that the advancing of pat P' calculated on the basis of the movement of belt B is less than that needed to clear the operating area, for example due to a slipping of the pat P' on belt B, and the starting position is restored only upon authorization by the detecting means.

It is clear that the above-described and illustrated embodiment of the feeder and of the operating cycle according to the above described embodiments is just an example susceptible of various modifications. In particular, the separation of pat P' from loin T' can be achieved by cutting means different from knife 5 although technically equivalent (e.g. rotating blades), possibly entrusting the function of cutting loin T' and the function of closing the outlet mouth 6 to two different members.

Similarly, the mechanism for moving pat P' in the pursuit phase could be different from the mobile shovel 8 if the feeder is located beyond the rear end of conveyor belt B rather than at the end portion thereof. In other words, if belt B is shorter and does not extend beyond walls S then the mechanism that must carry pat P' in queue with the previous pat P need not perform the function of isolating it from the underlying belt B as in the above-illustrated embodiment.

As a consequence, one could use a simple conveyor belt located before the outlet mouth 6 and arranged in line with conveyor belt B, obviously with a connecting plate between the two belts. However, this implies a higher risk of loss of tuna in the transfer between the two aligned belts during the passage on the connecting plate.

It should be noted that this further conveyor belt of the feeder could be used anyway even in combination with the mobile shovel 8. In this case, said conveyor belt would not perform the primary function of moving means for pat P', which function would still be performed by mobile shovel 8, but it would be provided with a continuous motion for the function of keeping pat P' in contact with the previous pat P when the canning machine belt B moves forward the latter. In this way, it is possible to prevent the crumbling of the "tail" of pat P caused by the acceleration of belt B that advances jerkily.

Finally, it should be noted that since the present feeder produces tuna pats P of the desired thickness and width whereas their length is unimportant given that they are then aligned sequentially, also the way in which the tuna loins T are loaded on the chute 3 is unimportant (they could even be loaded lengthwise rather than crosswise) whereby the operator's capacity does not affect the feeder operation.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the feeder for machine for canning tuna and the like and related operating cycle of the disclosure, and are not intended to limit the scope of what the inventors regard as their disclosure. Modifications of the above-described modes for carrying out the disclosure may be used by persons of skill in the art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A feeder for a canning machine for canning tuna and similar food products, comprising
   a feeding device with two overlapping conveyor belts, said feeding device being suitable to feed tuna loins towards a conveyor belt of said canning machine and to shape said tuna loins into tuna loins having a set thickness,
   an outlet mouth located at an end of said feeding device and through which said tuna loins having a set thickness are fed,
   cutting means located adjacent to said outlet mouth and suitable to separate a portion of loin projecting through the outlet mouth so as to obtain a tuna pat having set thickness and width,
   a longitudinally mobile wall located opposite the outlet mouth and having a width at least equal thereto, a distance from the outlet mouth to said mobile wall corresponding to a maximum width of the tuna pat to be formed, the mobile wall being also able to be placed in contact with said cutting means, and
   moving means suitable to move the tuna pat perpendicularly in a direction of motion of the conveyor belt of the canning machine.

2. The feeder according to claim 1, wherein the moving means comprise a mobile shovel, arranged under the mobile wall, said mobile shovel being mobile not only longitudinally as said mobile wall but also perpendicularly, said mobile shovel having a width at least equal to the width of the outlet mouth and a length greater than the width of the conveyor belt of the canning machine.

3. The feeder according to claim 1, wherein the cutting means comprise a knife perpendicular to the two overlapping conveyor belts of the feeding device, said knife having a length such as to cover a width of said two overlapping conveyor belts and a height such as to cover the outlet mouth.

4. The feeder according to claim 3, wherein the knife is driven by a pneumatic cylinder with an oblique motion.

5. The feeder according to claim 3, wherein members making up the outlet mouth act as a guide for the knife and are also suitable to scrape tuna that could stick to said two overlapping belts from said belts.

6. The feeder according to claim 3, wherein the mobile wall is mounted on a stem of a pneumatic cylinder suitable to put said mobile wall into contact with the knife.

7. The feeder according to claim 3, wherein the two overlapping conveyor belts consist of a bottom conveyor belt and a shorter top conveyor belt, overlapping the bottom conveyor belt and aligned therewith at a forward outlet end.

8. The feeder according to claim 7, wherein an operating distance between the two overlapping conveyor belts and an inclination of the top belt are adjustable.

9. The feeder according to claim 3, wherein the feeding device comprises a load chute arranged at a rear end of the feeding device and a containment wall along one side of the feeding device.

10. The feeder according to claim 7, further comprising a transverse idle roller arranged above the bottom conveyor belt and to the rear of the top conveyor belt, wherein a distance of the transverse idle roller from the bottom conveyor belt is adjustable.

11. The feeder according to claim 10, wherein the transverse idle roller is provided with a reciprocating motion in a longitudinal direction with respect to the bottom conveyor belt.

12. The feeder according to claim 3, further comprising detecting means suitable to detect the passage of a tail of the tuna pat beyond an operating area of the feeder.

13. The feeder according to claim 3, further comprising a conveyor belt located before the outlet mouth and arranged in line with the conveyor belt of the canning machine.

14. An operating cycle for the feeder of claim 1, comprising the following steps:
   a) feeding the tuna loins by way of the feeding device with the two overlapping conveyor belts, with simultaneous shaping of said tuna loins into tuna loins having a set thickness;

b) raising the cutting means that close the outlet mouth of said feeding device;
c) introducing said tuna loins having a set thickness through said outlet mouth, with simultaneous push on the mobile wall until the mobile wall reaches its rearmost position;
d) separating by way of the cutting means a portion of loin projecting through the outlet mouth, with simultaneous closure of the outlet mouth, so as to obtain a tuna pat having set thickness and width;
e) moving the tuna pat by way of the moving means until the tuna pat reaches a set distance from a last previously formed tuna pat arranged on the conveyor belt of the canning machine;
f) unloading the tuna pat on said conveyor belt;
g) waiting for a tail of the tuna pat to clear an operating area of the feeder or detecting passage of the tail of the pat beyond the operating area of the feeder; and
h) restoring a position of the mobile wall in contact with the cutting means.

15. The operating cycle according to claim 14, wherein step a) also includes passage under a transverse idle roller suitable to perform a pre-compacting.

16. The operating cycle according to claim 14, wherein
step f) includes moving the shovel longitudinally away from the conveyor belt; and
step h) includes restoring the position of the shovel (8) in contact with the cutting means.

17. The operating cycle according to claim 16, wherein step f) includes unloading the tuna pat on a dedicated conveyor belt of the feeder that in turn transfers the tuna pat to the conveyor belt of the canning machine.

* * * * *